W. Y. Adams,
Handcuff.
No. 1650. Reissued Apr. 5, 1864.
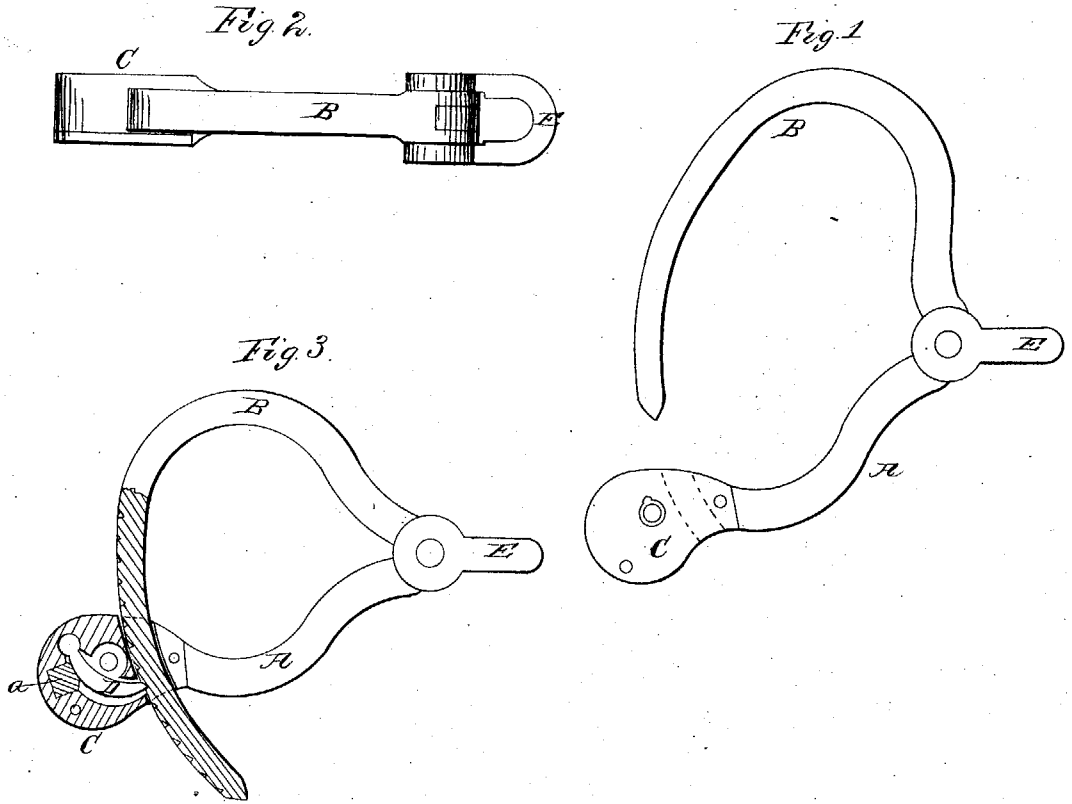
Witnesses.
John P. Sayre
Joseph Bishop
Inventor.
Wm. Y. Adams
by Francis S. Lowe
his Attorney
AM. PHOTO-LITHO. CO. N.Y. (OSBORNE'S PROCESS.)

UNITED STATES PATENT OFFICE.

GEORGE W. REED, OF NEW YORK, N. Y., ASSIGNEE OF WM. V. ADAMS, OF SAME PLACE.

IMPROVEMENT IN HANDCUFFS.

Specification forming part of Letters Patent No. 35,576, dated June 17, 1862; Reissue No. 1,650, dated April 5, 1864.

*To all whom it may concern:*

Be it known that WILLIAM V. ADAMS, of the city, county, and State of New York, did invent a certain new and Improved Handcuff or Shackle for Confining the Wrists and Ankles of Prisoners; and I do hereby declare that the following is a full and exact description thereof, reference being had to the accompanying drawings and the letters of reference marked thereon.

In the drawings, Figure 1 is a plan view of my handcuff or shackle. Fig. 2 is an end view of the same. Fig. 3 is a sectional view.

The handcuffs or shackles in common use for confining the wrists and ankles of prisoners consist of two sections hinged together so as to be closed upon the limbs and locked in a fixed manner without any adjustment to fit different-sized limbs. Such fixed handcuffs or shackles are often slipped off over small hands, thus giving the prisoner the free use of the hands to wrench the shackles from his ankles or otherwise assist in effecting his escape. In other cases the wrists and ankles of prisoners are necessarily compressed by the handcuffs and shackles fitting too tightly, thus producing chafing, acute swellings, and chronic sores.

The object of my invention is to produce a light yet strong and adjustable handcuff or shackle, thus with a single instrument fitting different-sized limbs without any excess of iron.

My invention consists of an adjustable handcuff or shackle of peculiar construction for accurately fitting either smaller or larger limbs, said cuffs or shackles being made in two sections pivoted together at one end of said sections, while the other ends are provided with an adjustable lock or fastening.

In the construction of my handcuff or shackle I make two sections, A and B, Figs. 1 and 3, and hinge the same together by a pivot, G, so that the two sections may be opened, as in Fig. 1, or closed, as in Fig. 3. Both of these sections are made very smooth and as light as is consistent with proper strength, in order to prevent chafing or compression and swelling from roughness or mere weight of iron.

The section A is much shorter than the other, and is provided with a concealed lock, C, shown in section in Fig. 3, where the face-plate of the lock is removed. In this lock is a dog or pawl, D, pressed forward by a rubber spring, *a*, Fig. 3.

The section B has a long finger, B′, notched upon its face, as shown at *e*, Fig. 3, and fitted to pass through a mortise or hole in section A, (or the lock C,) when the two sections are clasped together, as in Fig. 3. As the sections are closed together and the finger B′ enters the lock C to a greater or less extent, the spring-dog D automatically seizes the notched finger B′, preventing the same from being withdrawn. Thus the handcuff or shackle is made self-locking.

In order to loosen the handcuff or shackle from the limb of a prisoner, or to open the two sections, a key is inserted into the hole H, and the dog D thus pushed back from the notched finger until the latter is withdrawn.

The finger B′ must be accurately fitted to the mortise or hole in section A, (indicated in dotted lines, Fig. 1,) and the face-plate of the lock must be well riveted in place in order to prevent picking or breaking the lock. The position and lightness of the dog D makes it impossible for a prisoner to loosen the shackle by concussion of the lock.

The two sections A and B have a peculiar ogee curve (similar in both sections) extending from the hinge or pivot G nearly to the lock on the section A. When the sections are expanded, these ogee curves apply to or fit the limbs throughout the extent of the curves, as is apparent from Fig. 1; but when the sections are closed upon a small limb, as in Fig. 3, the sections approach each other at the points *b* and *c*, so as to narrow the general area or space for the limb, leaving a sharp angle at the hinge, into which the limb cannot enter. Thus the transverse diameter of the handcuff or shackle is diminished as the other diameter is shortened by closing the sections; or, in other words, the working diameters of the cuff or shackle are both lengthened and shortened by simply opening and closing the sections.

A hasp or staple, E, Fig. 2, embraces the hinge of the two sections A and B, thus strengthening such hinge without interfering with its free motion, and at the same time giving a proper attachment for a chain usually employed for connecting two cuffs or shackles, or for confining the prisoner.

One advantage of my adjustable shackle or handcuff is the convenience with which it may be expanded in case the limb is suddenly inflamed and swollen.

I am aware that a pair of handcuffs made of two pieces of metal connected by a single rivet in the form of a figure 8, or like a pair of shears, has been made adjustable upon both wrists by a single lock, therefore I do not claim such adjustment; but I believe my adjustable handcuffs or shackles for fitting one limb at a time and allowing to such limb a free, independent motion is new and a great improvement upon the handcuffs and shackles heretofore in use.

Having thus described my invention, what I claim, and desire to secure by Letters Patent of the United States, is—

1. A handcuff or shackle composed of the two sections A and B, hinged together and constructed substantially as described, and provided with the lock C or its equivalent.

2. In combination with the shackle, as above described, the clevis or staple E, substantially as set forth.

G. W. REED,
*Assignee.*

Witnesses:
E. P. BREED,
R. D. WELLS.